(12) United States Patent
Varman et al.

(10) Patent No.: US 10,069,975 B1
(45) Date of Patent: *Sep. 4, 2018

(54) CUSTOMER SERVICE CALL PROCESSING AND SUPPORT AGENT ACCESS APPLICATION

(71) Applicant: OPEN INVENTION NETWORK LLC, Durham, NC (US)

(72) Inventors: Mahendra Varman, Omaha, NE (US); Craig A. Webster, Omaha, NE (US); Jil M. Fisher, Omaha, NE (US)

(73) Assignee: Open Invention Network, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,914

(22) Filed: Oct. 31, 2017

Related U.S. Application Data (63) Continuation of application No. 15/333,386, filed on Oct. 25, 2016, now Pat. No. 9,807,240, which is a continuation of application No. 14/139,010, filed on Dec. 23, 2013, now Pat. No. 9,479,644.

(60) Provisional application No. 61/755,813, filed on Jan. 23, 2013.

(51) Int. Cl.
  H04M 3/42 (2006.01)
  H04M 3/51 (2006.01)
  H04M 3/523 (2006.01)

(52) U.S. Cl.
  CPC ..... H04M 3/5235 (2013.01); H04M 3/42068 (2013.01); H04M 3/5158 (2013.01); H04M 3/5166 (2013.01)

(58) Field of Classification Search
  CPC ........... H04M 3/42068; H04M 3/5158; H04M 3/5166; H04M 3/5235
  USPC ............ 379/201.02, 213.01, 218.01, 265.01, 379/265.02, 265.09, 265.11–265.13; 455/414.1
  See application file for complete search history.

(56) References Cited

U.S. PATENT DOCUMENTS

| | | | |
|---|---|---|---|
| 8,577,016 B1 * | 11/2013 | Duva ..................... | G06Q 10/00 379/201.01 |
| 9,420,103 B1 * | 8/2016 | Varman ................... | H04W 4/12 |
| 9,479,644 B1 * | 10/2016 | Varman ................... | H04W 4/12 |

(Continued)

*Primary Examiner* — Harry S Hong (57) ABSTRACT

Disclosed are a method and apparatus of receiving and processing customer support calls. The calls may be initiated from a mobile/wireless device via a call function or via a mobile device application. An example method of operation may provide receiving a call from a mobile device and identifying the call as a customer service support inquiry. The method may further provide intercepting the call and redirecting the call to an interactive voice response proxy device responsive to identifying the call as a customer service support inquiry, accessing a database responsive to receiving the call and retrieving a data record that was created when the call was initiated. The data record may include a mobile device identifier of the mobile device and a present inquiry identifier of a type of customer support inquiry associated with the call and the method may also include identifying the customer inquiry and a customer profile stored on the data record, and determining a location to route the call based on at least one of the customer inquiry and the customer profile information on the data record.

20 Claims, 7 Drawing Sheets

(56) References Cited

U.S. PATENT DOCUMENTS 9,807,240 B1 * 10/2017 Varman ............... H04M 3/5235

* cited by examiner

CUSTOMER SERVICE CALL PROCESSING AND SUPPORT AGENT ACCESS APPLICATION

CROSS-REFERENCE TO RELATED APPLICATIONS

This application is a continuation from U.S. patent application Ser. No. 15/333,386 entitled "CUSTOMER SERVICE CALL PROCESSING AND SUPPORT AGENT ACCESS APPLICATION" filed on Oct. 25, 2016, which is a continuation from and claims priority from patent application Ser. No. 14/139,010 entitled "CUSTOMER SERVICE CALL PROCESSING AND SUPPORT AGENT ACCESS APPLICATION" filed on Dec. 23, 2013, now issued U.S. Pat. No. 9,479,644, which is a continuation from and claims priority from provisional patent application No. 61/755,813 entitled "CUSTOMER SERVICE CALL PROCESSING AND MOBILE DEVICE APPLICATION SUPPORT" filed on Jan. 23, 2013, the entire contents of each of which are hereby incorporated by reference.

TECHNICAL FIELD OF THE APPLICATION

This application relates to a method and apparatus of receiving a customer service call via a mobile device and processing the call to invoke a customer service application on the mobile device without requiring a customer service representative to answer the call.

BACKGROUND OF THE APPLICATION

Conventionally, when a subscriber of a particular service, (e.g., cable television, online account, etc.) has a problem or needs assistance managing his or her account, the user's only recourse was to dial a telephone number, be placed on hold and begin navigating a touch pad menu, such as a dual tone multi-frequency (DTMF) interface. In recent years, voice recognition or interactive voice response (IVR) systems are able to provide menu options that involve the subscriber speaking certain responses into their phone devices. The voice responses are received and processed into digital signals which are matched against certain options associated with the spoken responses.

Receiving a call, offering IVR menu options and presenting options to subscribers still requires an expensive call processing platform that is tied to customer service representatives. In recent years, mobile device applications and online services have offered users with various upgrade, support, cancellation, and other service options. When a user attempts to call a customer service center, the call may be further integrated with the user's online resources to reduce the amount of interactions requiring a live customer service representative.

SUMMARY OF THE APPLICATION

One example embodiment of the present application may provide a method that includes receiving a call from a mobile device, identifying the call as a customer service support inquiry and intercepting the call and redirecting the call to an interactive voice response proxy device responsive to identifying the call as a customer service support inquiry. The method may also include accessing a database responsive to receiving the call and retrieving a data record that was created when the call was initiated, the data record including a mobile device identifier of the mobile device and a present inquiry identifier of a type of customer support inquiry associated with the call, identifying the customer inquiry and a customer profile stored on the data record, and determining a location to route the call based on at least one of the customer inquiry and the customer profile information on the data record.

Another example embodiment may provide an apparatus that includes a receiver configured to receive a call from a mobile device, and a processor configured to identify the call as a customer service support inquiry, intercept the call and redirect the call to an interactive voice response proxy device responsive to identifying the call as a customer service support inquiry, access a database responsive to the call being received and retrieve a data record that was created when the call was initiated, the data record including a mobile device identifier of the mobile device and a present inquiry identifier of a type of customer support inquiry associated with the call, identify the customer inquiry and a customer profile stored on the data record, and determine a location to route the call based on at least one of the customer inquiry and the customer profile information on the data record.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
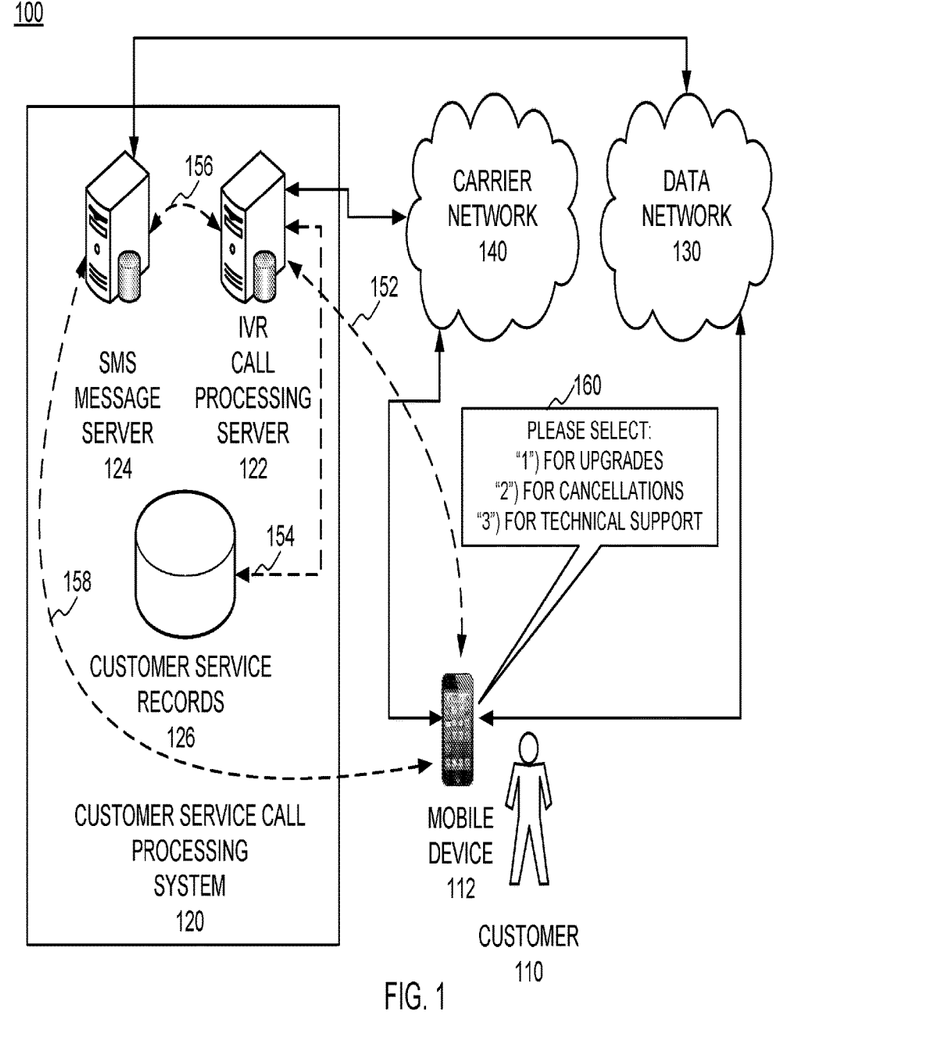
FIG. 1 illustrates a network system configuration according to example embodiments of the present application.

FIG. 1 illustrates an example communication network and call processing system according to example embodiments. Referring to FIG. 1, the network 100 includes a customer 110 operating a mobile device 112 and dialing a call to a customer service call processing system 120. The call may be placed by calling a "1-800-xxx-xxxx" number or other telephone number that utilizes a carrier network 140 to route the call to the call center 120. The call may be initially received by an interactive voice response (IVR) call processing sub-system and/or server 122. The device may be a computer, laptop, mobile, wireless or cellular phone, a PDA, a tablet, a client a server or any device that contains a processor and/or memory, whether that processor or memory performs a function related to an embodiment of the invention.

In operation, the customer 110 may dial a customer service telephone number via his or her mobile device 112. The call may be routed via a signaling operation 152 to an IVR call processing server 122. The IVR call processing server 122 may have multiple different statuses, such as dormant, energy saving and/or unresponsive, aware and passive, and/or aware and active. A dormant state may be a quiet state where no calls are present or are currently in queue to be processed. The aware and passive state may be a state where the server 122 is aware of an incoming call(s), which may be identified in a call queue or may have been received by the server 122. However, such calls received from mobile device users may not be readily accepted by an IVR menu option processing module of the IVR call processing server 122. Instead, the IVR processing server 122 may receive a call and not invoke an IVR call processing menu option and may instead reference the caller's identification information, telephone number and other information to determine how to process the call.

In operation, once the IVR call processing server 122, receives the call, the receiving of the call may invoke an intermediate state or an aware passive state that then identifies a customer record stored in a customer record database 126 that matched the call number. The customer record may be a data file or database entry that identifies the caller by his or her device telephone number and the number of times the caller has accessed the call processing IVR system (e.g., the last 90 days, 60 days, 30 days), how new the customer account is to the subscription services (e.g., 10 days, 30 days, 90 days), any special treatment indicators (e.g., special needs client, platinum/highest paid subscription package member, paid subscription to services, etc.). The data file may then calculate a score or provide an indicator as to whether the mobile device 112 is entitled to access the IVR help menu. The IVR call processing server 122 may perform such a determination at call processing operation 154 and then determine whether to allow the IVR menu to be presented to the mobile device 112. If the IVR call processing server 122 invokes the IVR menu option then it may elevate a status of the call processing server 122 from the aware passive state to the active state, which automatically invokes the IVR menu options being initiated and transmitted to the mobile device 112 via the ongoing voice call. The mobile device may now be able to process the call and respond to IVR menu prompts to reach the appropriate services.

According to another example, if the IVR call processing server 122, while in the aware passive state is unable to determine a mobile device status and/or identifies the mobile device 112 as not being entitled to the IVR call processing menu, then the call is processed to present other options to the customer unrelated to live call interaction. For example, the user may have called into the customer service IVR menu too many times in one month and/or may not be subscribed to receive the live call agent privileges, etc., and the call may be terminated and/or rejected by the call processing server 122. As a result, the call processing server 122 may remain in the aware passive state and not permit call elevation to another more active and responsive state, such as the active state.

Upon identifying that the call will not be processed by the IVR server operations, menus, functions, etc. The call may be immediately forwarded to the SMS message server 124 via a communication operation 156 and the mobile device telephone number may be automatically invoked into a SMS message creation procedure that generates a SMS message that identifies the mobile device, and which informs the mobile device of a web link URL or other information link to select to use an online application. Also, a login page may be invoked by the SMS message when it is accepted and pushed to the mobile device 112. The SMS message may include an application identified used as a trigger to invoke an installed application on the mobile device to load and begin operating so the user may select the menu options or other information to assist with the user's problems. Also, a non-installed application may be automatically installed by the SMS message being received and/or selected by the user. The SMS message may be sent at signaling operation 158 to the mobile device 112 to begin the application based support functions.

Once the mobile device 112 receives the SMS message, the application may be invoked and a shortcut set of menu options 160 may be presented on the device display to solicit a user response. For example, the user may select "1" for upgrades to service, or "2" for cancellation of services and/or "3" for technical support. According to one example, the user presented options and menu invocation presented on the device display may be specific to a pre-diagnosis performed by the IVR call processing server 122. For example, the IVR call processing server 122 while in the aware and passive state may permit a single menu option to the user to obtain a basic understanding of the customer's purpose for calling. For example, the IVR call processing server 122 may invoke a basic three-option menu to permit a user to select a reason for calling. The selection may invoke a decision as to whether the IVR server 122 will terminate the call, reject the call, re-route the call, etc. For example, the user may receive the single menu prompt from the automated IVR call processing system and identify "1"—"service upgrades" as the reason for calling. The IVR call processing system may be setup to immediately reject the call and not invoke any additional menu options to be presented to the mobile device 112. Instead, the IVR call server 122 may forward a problem identifier to the SMS message server 124 that notifies the type of problem the customer is experiencing based on the feedback received from the IVR call server 122. The SMS message server 124 may then communicate with the mobile device via the carrier network 140 or the data network 130 via a SMS message. As a result, the SMS message generated may include a tag identifier that invokes a specific menu option on the user's customer support application so the user is presented with an application page that is directly related to the problem/inquiry currently experienced by the customer 110.

Figure 2A:
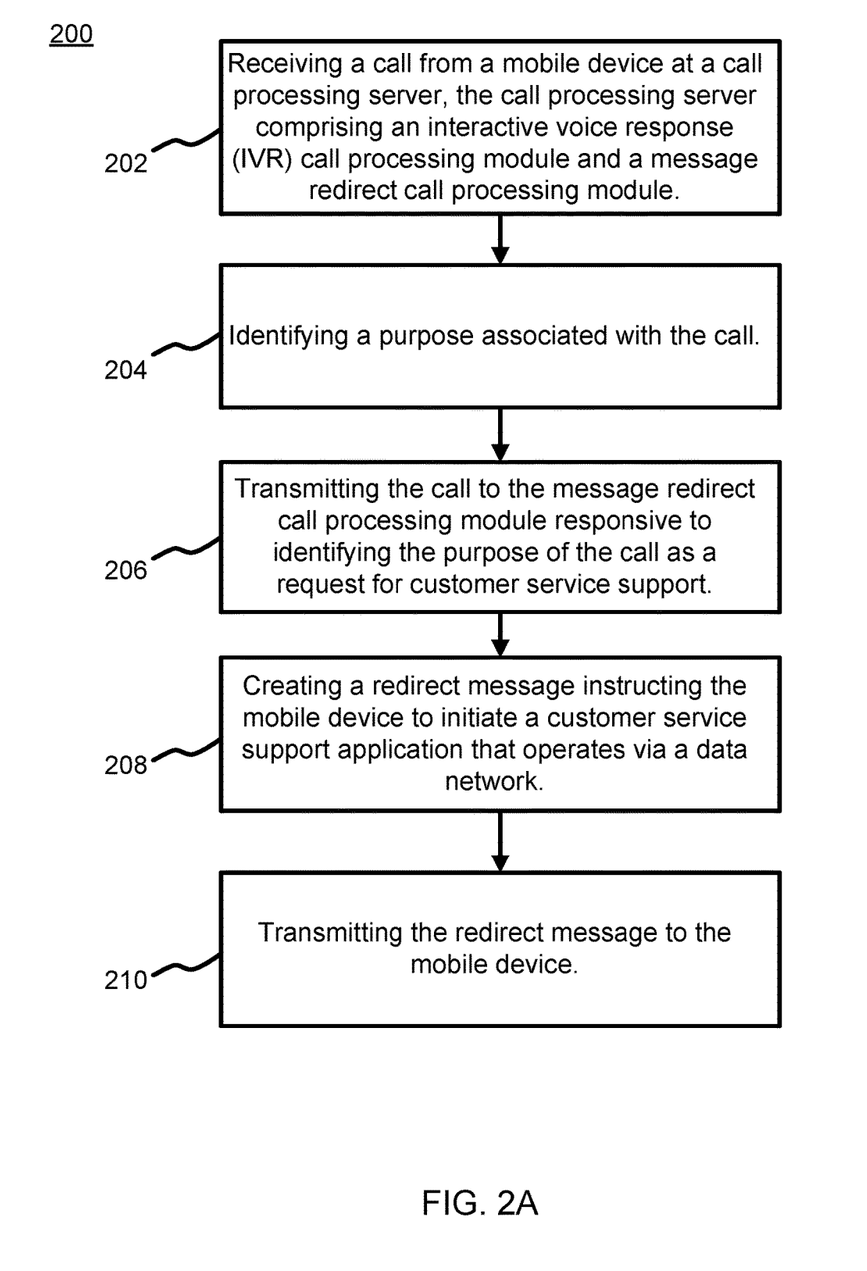
FIG. 2A illustrates an example flow diagram according to example embodiments of the present application.

FIG. 2A illustrates one example method of operation which may include the IVR call processing server 122 receiving a call from the mobile device 112 at operation 202. The call may be a request for customer service and the caller of the mobile device may be seeking access to a customer service representative. The call processing server may be an IVR server and/or may have an IVR call processing module configured to process calls via IVR menu options and feedback. The call processing server may also include a message redirect call processing module that drops, terminates, re-routes, rejects or partially processes calls.

The example method of operation may also include identifying a purpose associated with the call at operation 204 and transmitting the call to the message redirect call processing module responsive to identifying the purpose of the call as a request for customer service support at operation 206. The method may also include creating a redirect message instructing the mobile device to initiate a customer service support application that operates via a data network via operation 208, and transmitting the redirect message to the mobile device at operation 210. The redirect message is a short message service (SMS) message.

In most instances, the call server or IVR call processing server and/or module is setup to reject every call received at least partially. In one example, only a designated 'X' number of calls are permitted in a particular time period to be received and processed through the IVR. For example, only 3 calls per month may be allowed from a particular mobile number to access and be processed by the IVR system. Any calls after that number may be met with a message that the user has exceeded the limit or that their call will not be allowed through or that they need to access the application and retrieve information via their mobile devices for further assistance, or that they need to download such an application or they will be required to pay for the service this time. Only numbers from certain mobile devices may be permitted to access the IVR. For example, only numbers from devices associated with more lucrative or privileged accounts (e.g., platinum level, handicap, etc.) can access the IVR service center and perhaps even a live agent. Others must use an application first (or other information) on their devices for further assistance or they need to download such an application or can pay for the service. The users may be able to walk through an application based help session and receive a privileged code if they still need help via the online dialing tool after all options on the mobile device have been exhausted.

The SMS message received by the mobile device may include an application launch trigger that initiates the customer service support application. The example method of operation may also include terminating the call prior to transmitting the redirect message to the mobile device, and if the purpose of the call is identified as being different from a request for customer service support, then transmitting the call to the IVR call processing module. The purpose of the call may be determined based on the telephone number dialed by the mobile device or based on metadata included with the call or based on a preliminary feedback screening performed by the call processing server. For example, the purpose of the call may be determined based on a menu option selection performed on a mobile device application used to initiate dialing of the call.

Figure 2B:
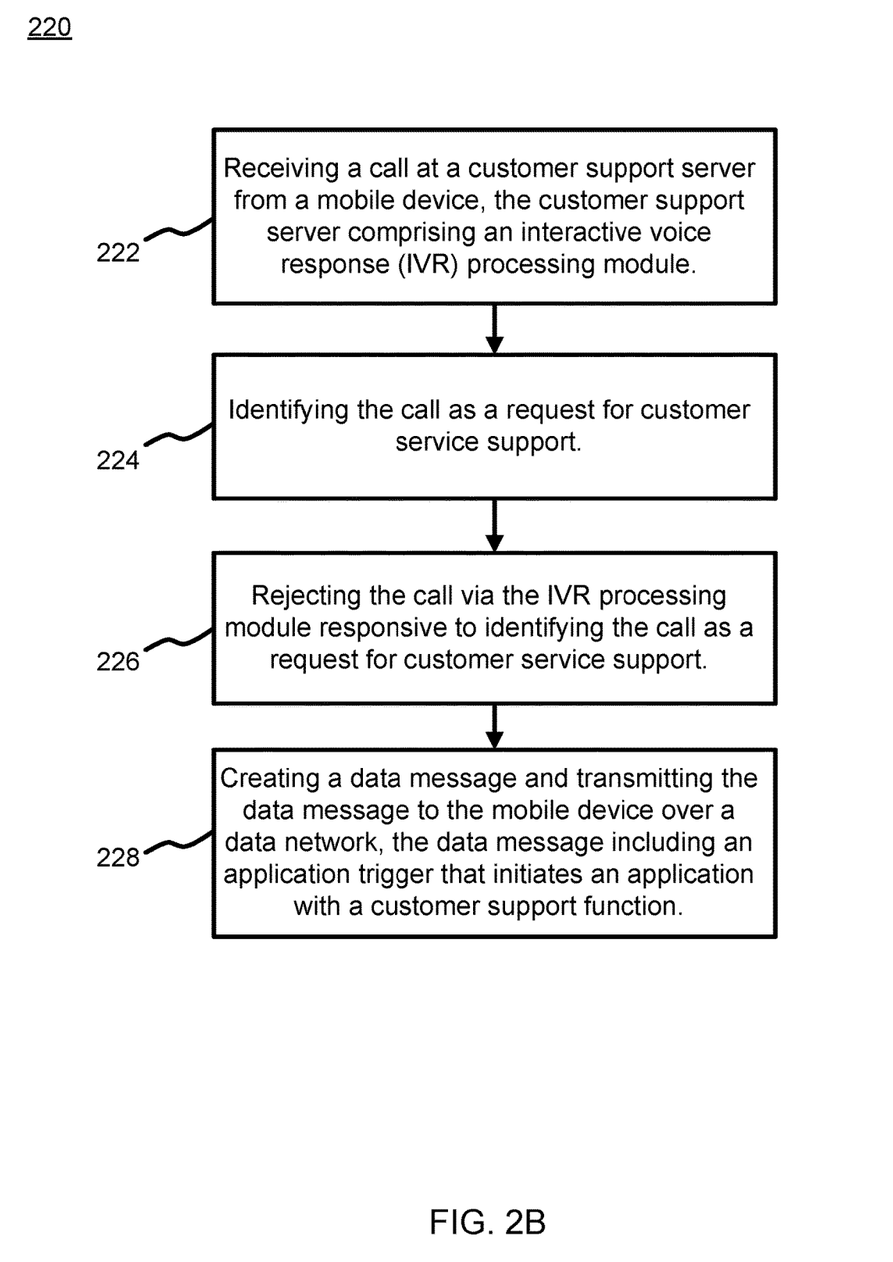
FIG. 2B illustrates another example flow diagram according to example embodiments of the present application.

FIG. 2B illustrates another example method of operation 220. Referring to FIG. 2B, the method may include receiving a call at a customer support server from a mobile device at operation 222, the customer support server may include an interactive voice response (IVR) processing module. The method may also include identifying the call as a request for customer service support at operation 224 and rejecting the IVR processing module and terminating the call responsive to identifying the call as a request for customer service support at operation 226. The method may also include creating a data message and transmitting the data message to the mobile device over a data network, the data message may include an application trigger that initiates an application with a customer support function at operation 228.

According to another example embodiment, the communication between a customer and an agent may be setup and processed via the user's customer support application on his or her mobile device. However, the agent may require a degree of privacy and separation from the customer especially in an outsourced or unconventional environment. For example, the customer service agent may not be on the other side of a private branch exchange (PBX) and may be operating from his or her own mobile device. In this case with the customer service representative operating a mobile device, which is becoming increasingly popular as landline services are becoming less common, the customer service agent requires a degree of privacy so the customer will not call them back on their personal phone line.

Figure 3A:
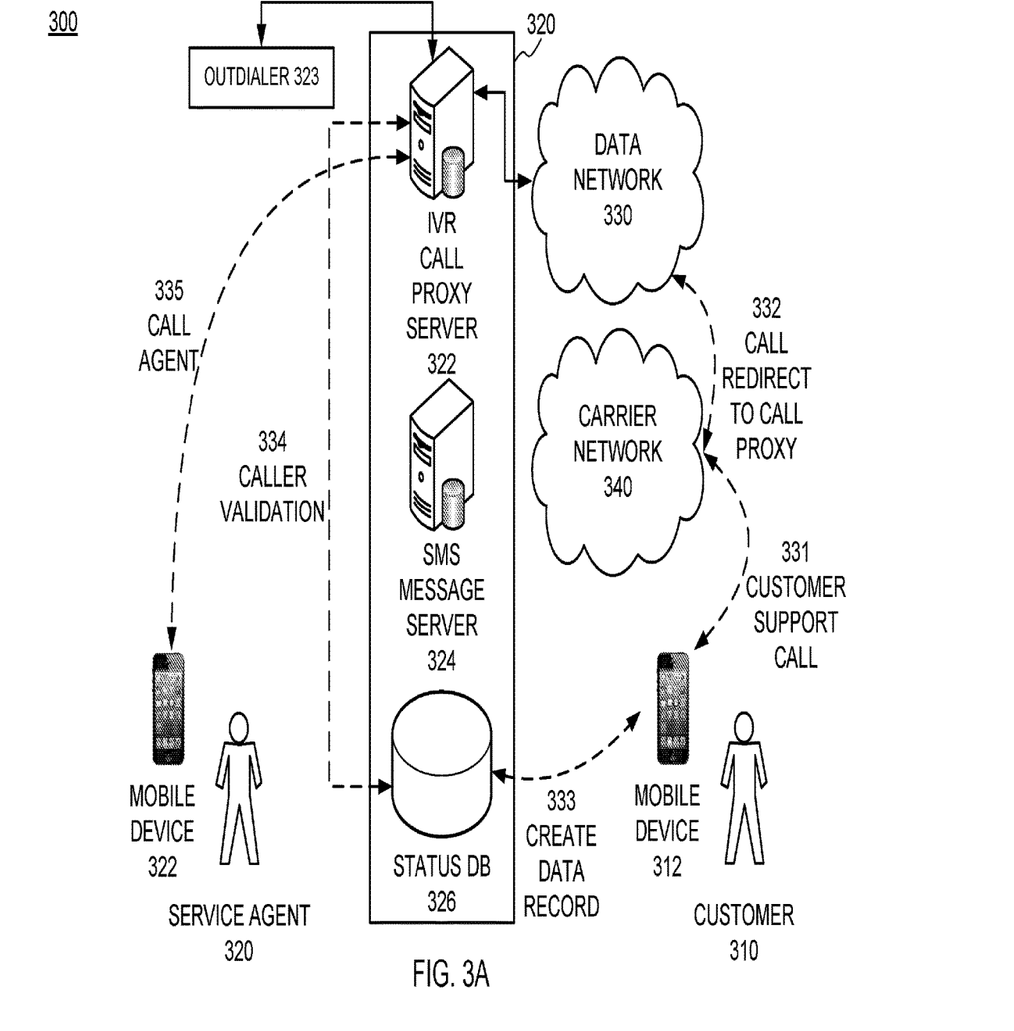
FIG. 3A illustrates an example communication network configured to validate and access customer agent support according to example embodiments of the present application.

FIG. 3A illustrates an example communication network configured to validate and access customer agent support according to example embodiments of the present application 1. Referring to FIG. 3A, the network configuration 300 includes a call processing center or customer service center 320 with a carrier network call processing support infrastructure and an interactive voice response proxy server 322 for 'proxying' calls initiated by the customer 310 via his or her mobile device 312. The call processing service center 320 also provides a SMS message processing server 324 to communicate with a customer via their corresponding data network 330 and related services supported by their mobile device 312.

In operation, one example method of operation may include receiving a call from a mobile device at the call processing center 320. The call may be initiated as a push button selection on a mobile device application or via a dial pad call feature of the device. The call may be directed to a customer support telephone number 331. The call may never reach the carrier phone network 340 and may be cross-referenced with a database and/or data file of numbers to be redirected upon initial dialing efforts. Once the redirect is performed 332, the call may be transmitted to the data network 330 which forwards the call as a data message, text message, SMS message, etc. instead of phone call to a IVR call proxy server 322. The method may also include identifying the call as a customer service support inquiry, intercepting the call and redirecting the call to the interactive voice response proxy server 322 responsive to identifying the call as a customer service support inquiry. Once the call is sent to the IVR proxy 322, additional operations may include accessing a status database 326 responsive to receiving the call and retrieving a data record that was created 333 when the call was initiated, the data record includes a mobile device identifier of the mobile device and a present inquiry identifier of a type of customer support inquiry associated with the call. The call may also be identified by a customer inquiry (e.g., technical support, service upgrade, cancellation, etc.) and a customer profile stored on the data record 334 which identifies the user by his or her account status (e.g., basic service, platinum service, new customer, etc.). The database stored user profile may provide information used for determining whether the customer has agent access privileges which may be offered to a new customer (e.g., first month of service, first time calling, etc.), or a platinum subscriber paying for more services or other privileged customers, such as a special needs customer, etc. When the caller is identified as having access to the agent, the call may be routed 335 to at least one of an interactive voice response menu and an agent call device 322 associated with a live agent 320.

Routing the call may also include operating an outdialer 323 calling function of the interactive voice response proxy device to keep the agent's telephone number from being accessible to the mobile device during the call. By dialing the agent directly from the outdialer 323 and connecting the call to the customer device 312 and the agent device 322, the call may be maintained by a connection provided by the server but the reference point for the customer device 312 is the IVR call proxy server 322. The agent call device associated with the live agent may be a mobile device. When routing the call to the agent call device associated with the live agent, the call may instead by routed to a live agent queue that automatically dials the agent call device when the agent is available. Also, the call may instead be forwarded to an IVR call processing system prior to connecting with a live agent to determine whether the call can be resolved via an automated menu. The application operating on the mobile device 312 may be executed and a phone call option to dial a customer service support agent via the application is selected prior to the call being received from the mobile device.

According to example embodiments, the caller or user may experience difficulty with operating an automated menu. The menu may prompt the user via a recorded and/or digitally create voice sample to provide their name, username, password, account number, reason for calling, etc. However, the user may be unable to satisfy the menu requirements and may not be able to provide the correct information in the time required. For instance, the user may get stuck and forgot his/her account number, or the user may not understand questions posed by the mobile application.

The data record stored in the database prior to being connected with the IVR call may be empty or may not include any specific call processing data. At the time the user device connects with the call processing application, the mobile application would send relevant data about the session to a particular call processing platform. The data provided may include a user account number, certain symptoms being encountered, and the particular portion of the application currently being accessed by the user device. The database may track transfer requests in progress and map data gathered during the mobile self-service session to the subsequent incoming phone call.

When attempting to contact a user device, the call processing application may select an unused inbound number from a pool of numbers and return it to the mobile application. The mobile application may dial the number received, and when the application is connected with an inbound call to that number, it has the user device connected and can associate the incoming call with a corresponding recording in the database. Once the record is retrieved from the database, the phone number can be freed to be used by a subsequent caller.

The IVR menu and corresponding call processing application may access the status database when the incoming call is being associated with data gathered by the mobile application. In some scenarios, the caller ANI of the user's mobile device may be identified and used to reference the user. Since the mobile application may not be able to access the mobile device number (ANI), the mobile application may need to have the caller enter their mobile phone number the first time they use the mobile application. Even if the user has provided their mobile number to the mobile application, it is possible that they have also disabled the caller identification features, so that the IVR platform will not receive their ANI in which case other ANI identification efforts must be performed.

In order to determine whether the call is valid, the IVR determines each time a number from the number pool is used, in which case a call may be received or anticipated shortly thereafter. If the user disconnects or leaves the mobile application, the database record will have a timer that will initiate or expire so the application will assume that the user is not calling, and thus returns the number to the pool and updates the database record.

The agent who answers calls would typically be located in a standard call center equipped with user telephones or call answering devices. However, the user who is seeking access to the agent may not want to disclose his or her personal phone number in order to reach the agent, as that would provide customers a way to bypass the IVR for all future inquiries. The agent's phone number is never directly dialed by the mobile phone operated by the user. Instead, the mobile phone would operate the call application and dial a number which forwards the call to the IVR platform. After the IVR platform obtains the associated call data, it is able to dial the call center with the number not disclosed to the user of the mobile application and/or is able to submit a route request to an enterprise routing system in order to reach the call center that has agents available.

Figure 3B:
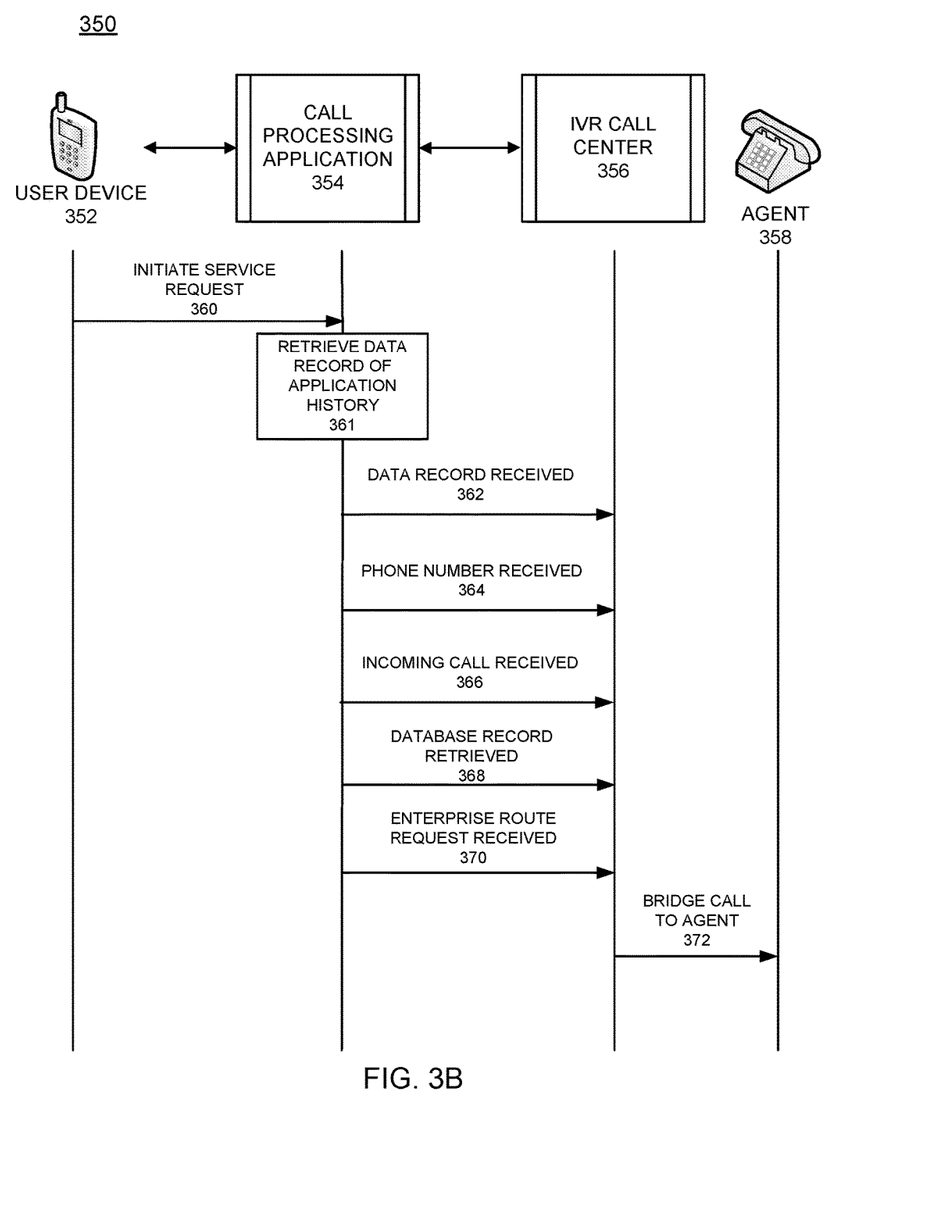
FIG. 3B illustrates an example system diagram of communication signaling among various system components according to example embodiments.

FIG. 3B illustrates an example application processing and user request routing system configuration. Referring to FIG. 3B, the system diagram 350 includes a user device 352 which initiates a service request 360 for service via a menu option on the mobile device 352. In operation, when the "click-to-call" application button or menu option is selected on the user device 352, instead of the phone or user device 352 calling a phone number, the call processing application 354 accesses an IVR proxy device and/or application and a data record is transmitted to the call processing application or the record is retrieved 361 so the CTI data may be identified along with the user identification. Also, a phone number is received and dialed to access the IVR call center 356. On the IVR call center side of the call connection, the data record is received 362, a phone number is obtained and transmitted 364, an incoming call is received 366, the corresponding database record is retrieved 368 that corresponds to that user device 352, an enterprise route request is made 370 with computer telephony integrated (CTI) data, and the incoming call is bridged to the appropriate call center for connection to an agent 372. The agent receives the inbound call with CTI data and conducts the support call accordingly.

The outdialer is an application that accepts requests and passes those requests onto an IVR application which executes a specific call flow when an answer is received on the other end. The user of a mobile application may be connected with an agent without having to provide the phone number of the mobile device. Also, the user of the mobile application may be connected with an agent at a call center while CTI data is provided about what the user was doing in the mobile application. The agent would not have to re-ask the caller for data fields the caller had already entered on the mobile application. This provides an intelligent routing capability to connect the user of a mobile application with the best agent by being able to utilize the same enterprise routing infrastructure used by the IVR application.

Figure 4:
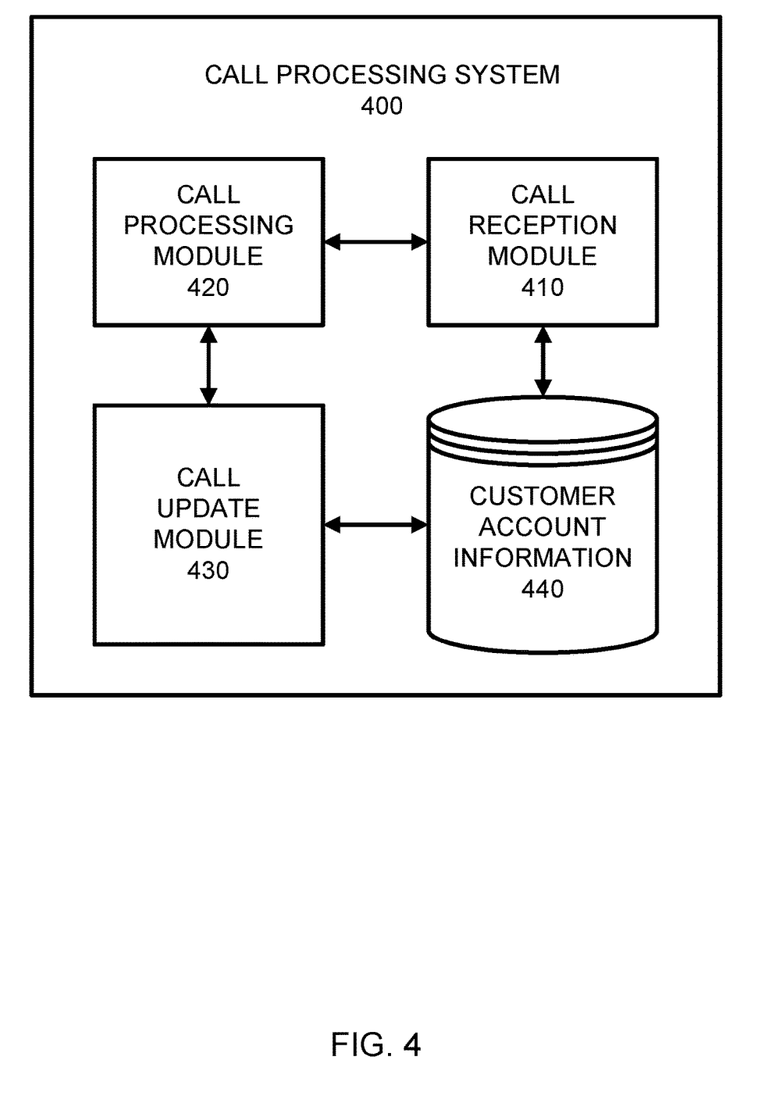
FIG. 4 illustrates a system configuration that is configured to perform one or more operations corresponding to the example embodiments.

FIG. 4 illustrates an example system diagram of a call processing system 400. Referring to FIG. 4, the system may include a call reception module 410 that is configured to receive calls to be handled by the call processing system. The call may be received and processed to determine the identity of the caller via the call processing module 420. The caller identity information may be stored in the caller database 440 and retrieved and updated by the call update module 430 as calls are received and processed.

In one example method of operation, the system 400 may perform an example call processing function. The operations may include receiving a call from a mobile device and routing the call to an appropriate destination via the call reception module 410, the call processing system may also have an interactive voice response (IVR) call processing module 420 and a message redirect call processing module or update module 430. In operation, the received call is identified as having a particular purpose via the call processing module 420. Next, the received call is transmitted to the message redirect call processing module responsive to identifying the purpose of the call as a request for customer service support. The method may also include creating a redirect message instructing the mobile device to initiate a customer service support application via the call processing module 420 that operates via a data network, and transmitting the redirect message to the mobile device via the call update module 430.

Continuing with the same example method of operation of the system 400 additional operations may include the redirect message being a short message service (SMS) message which includes an application launch trigger that initiates the customer service support application. The user may receive the message at his or her mobile device and a corresponding application download may launch or already installed, the application may initiate a particular launch option that may be automatically initiated or which may be performed responsive to a user selection operation. The method may also provide terminating the call prior to transmitting the redirect message to the mobile device or contemporaneously. In one example, if the purpose of the call is identified as being different from a request for customer service support, then the call may be transmitted to the IVR call processing module and the purpose of the call is determined based on the telephone number associated with the mobile device and based on previously logged calls received from the telephone number associated with the mobile device. For example, a user profile of the mobile device may be retrieved and a preliminary label may be associated with the mobile device as "new caller", "existing customer", "not privileged account", etc., to determine whether the user may receive access to a live agent or is only entitled to use the mobile device application. The purpose of the call may also be determined based on a menu option selection performed on a mobile device application used to initiate dialing of the call (e.g., customer support, technical support, upgrade support, etc.).

Identifying the purpose associated with the call may also include identifying the call as a request for customer service support, and then the call may be rejected prior to transmitting the redirect message to the mobile device via the IVR processing module. The call may also be terminated responsive to identifying the call as a request for customer service support, and thereafter a plurality of short message service (SMS) messages may be transmitted to the mobile device that include customer service support functions and options prompting the user for a response and to assist the user with his or her account.

According to another example embodiment, the system 400 may be configured to receive a call from a mobile device, identify the call as a customer service support inquiry, intercept the call and redirect the call to an interactive voice response proxy device responsive to identifying the call as a customer service support inquiry. The call is now identified as having a particular purpose and may be routed accordingly. In order to determine more call related information, a database may be accessed responsive to receiving the call and a data record may be retrieved that was created when the call was initiated, the data record may include a mobile device identifier of the mobile device and a present inquiry identifier of a type of customer support inquiry associated with the call. The customer inquiry and a customer profile stored on the data record may be identified and a location to route the call based on at least one of the customer inquiry and the customer profile information on the data record may also be identified.

Next, it may be determined whether the customer has agent access privileges, and if so, the call may be routed to an interactive voice response menu and/or an agent call device associated with a live agent. Routing the call may include operating an outdialer calling function of the interactive voice response proxy device to keep the agent's telephone number from being accessible to the mobile device during the call. The agent call device associated with the live agent is a mobile device. The call request may be forwarded to an outdialer call proxy server and the agent's phone number may be dialed from the outdialer call proxy, and the live call between the mobile device and the agent call device may be connected via the outdialer call proxy server. Routing the call to an interactive voice response menu or the agent call device associated with the live agent may include routing the call to a live agent queue that automatically dials the agent call device when the agent is available. The application operating on the mobile device is executed and a phone call option to dial a customer service support agent via the application is selected prior to the call being received from the mobile device and the method also include creating the data record in a database including the mobile device identifier of the mobile device and the present inquiry identifier of the type of customer support inquiry associated with the call responsive to executing the call from the mobile device.

According to an example method of operation, a user may download the mobile application and utilize the application to address a current issue, such as a service failure or other question or problem that requires resolution. The user may desire to speak with an agent and select a "click-to-call" button as part of the mobile application. The mobile application may automatically initiate a call function (i.e., service call) by retrieving and inserting a data record in a status database (DB). The click-to-call service acknowledges receipt of the data and the mobile application dials a static telephone number assigned to the service department. The automatic number identification (ANI) is used to obtain a real ANI and/or a custom key/ANI. The interactive voice response service (IVR) may receive an incoming call from the mobile device ANI and access the status DB to confirms it's a valid call. As a result, the IVR may dial an agent to connect with the mobile device.

According to another example embodiment, the click-to-call service may obtain a telephone number from a pool of numbers and use that number to process the call dial operation. The application may then initiate a call using that telephone number selected from the pool. The IVR receives the incoming call and accesses a status DB so the IVR confirms it is a valid call and dials the agent accordingly. In another example embodiment, the mobile application may insert a mobile number into an outdialer service to dial the service center. Thereafter, when the mobile application disconnects, the outdialer dials the mobile application user and transfers the call to an agent queue. The outdialer may dial an agent and the agent is transferred to the mobile user who downloaded the mobile application. The user utilizes the mobile application to address a support issue and if the user desires to speak with an agent and presses the "click-to-call" button on the mobile application, then the short message service (SMS) sends a key to the "click-to-call" service. The "click-to-call service then sends a telephone number to dial to the application based on whatever telephone number was sent in the SMS content. Also, the browser could trigger a URL to send the application data from a secure link. A key may be needed to authenticate the link access which could be in a ANI field.

According to another example, the mobile application may access a context service to dial the agent. The data needed to place the call is stored in the context service and retrieved via the ANI or via a rotating dialed number identification service (DNIS) pool of available number which are accessed and selected one at a time. In operation, the mobile application may access the context service data that is stored in the context service, which is similar to the ANI or rotating DNIS pool etc. Alternatively, the application may use a queue status service if no agents are currently available. The application responds to the user with a message that all agents are busy and if whether the user desires to schedule a call back or continue to wait. The application may then use a rules engine to schedule a call back at a certain time when the agent availability becomes accessible. The service may route a request to an intelligent routing proxy server.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components of FIG. 1, etc.

Figure 5:
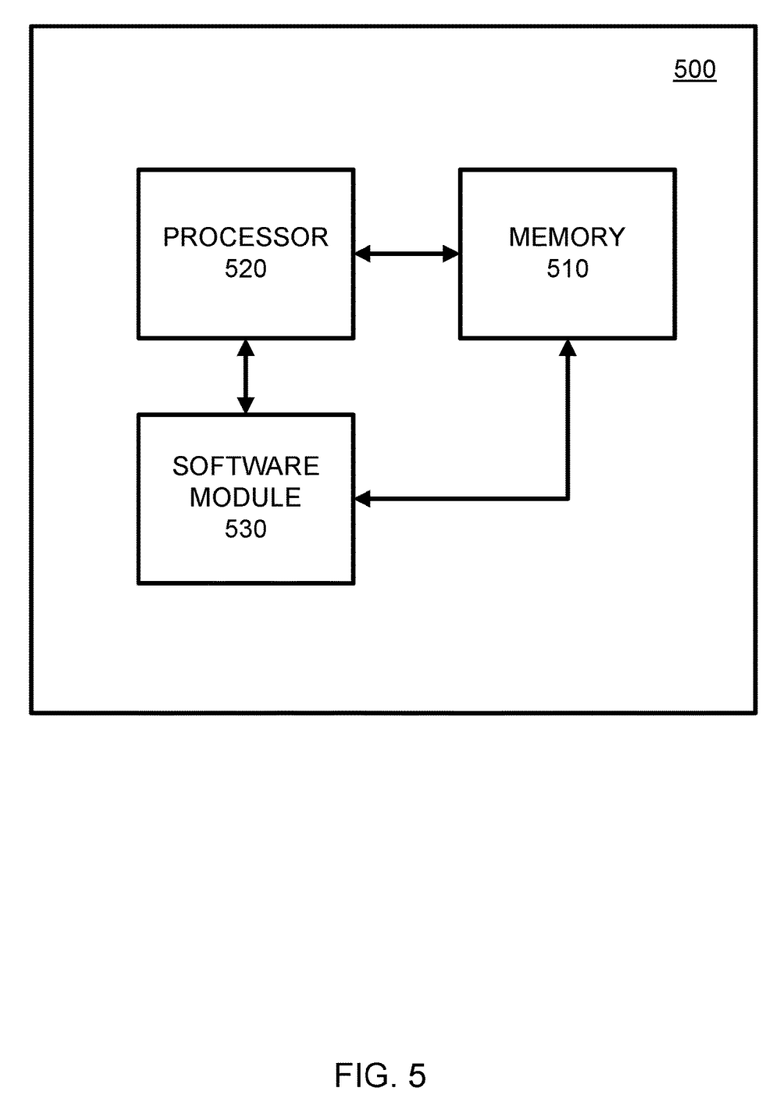
FIG. 5 illustrates an example network entity device configured to store instructions, software, and corresponding hardware for executing the same, according to example embodiments of the present application.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 4 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   intercepting a customer service support inquiry call from a mobile device;
   redirecting the call to an interactive voice response proxy device;
   retrieving a data record comprising a present inquiry identifier of a type of customer support inquiry associated with the call;
   determining a location to route the call based on at least one of the customer inquiry and a customer profile information on the data record;
   determining whether the customer has agent access privileges; and
   if so, routing the call to at least one of an interactive voice response menu and an agent call device associated with a live agent.

2. The method of claim 1 comprising identifying the call as a customer service support inquiry.

3. The method of claim 1, wherein routing the call comprises operating an outdialer calling function of the interactive voice response proxy device to keep the agent's telephone number from being accessible to the mobile device during the call.

4. The method of claim 1, wherein the agent call device associated with the live agent is a mobile device.

5. The method of claim 1, further comprising:
   forwarding the call request to an outdialer call proxy server and dialing the agent's phone number from the outdialer call proxy; and
   connecting the live call between the mobile device and the agent call device via the outdialer call proxy server.

6. The method of claim 1, wherein routing the call to at least one of an interactive voice response menu and the agent call device associated with the live agent further comprises routing the call to a live agent queue that automatically dials the agent call device when the agent is available.

7. The method of claim 1, wherein the application operating on the mobile device is executed and a phone call option to dial a customer service support agent via the application is selected prior to the call being received from the mobile device; and
   creating the data record in a database comprising a mobile device identifier of the mobile device and the present inquiry identifier of the type of customer support inquiry associated with the call responsive to executing the call from the mobile device.

8. An apparatus, comprising:
   a processor configured to:
   intercept a customer service support inquiry call from a mobile device;
   redirect the call to an interactive voice response proxy device;
   retrieve a data record comprising a present inquiry identifier of a type of customer support inquiry associated with the call;
   determine a location to route the call based on at least one of the customer inquiry and a customer profile information on the data record;
   determine whether the customer has agent access privileges; and
   if so, route the call to at least one of an interactive voice response menu and an agent call device associated with a live agent.

9. The apparatus of claim 8, wherein the processor is configured to identify the call as a customer service support inquiry.

10. The apparatus of claim 8, wherein the call is routed by an outdialer call function of the interactive voice response proxy device to keep the agent's telephone number from being accessible to the mobile device during the call.

11. The apparatus of claim 8, wherein the agent call device associated with the live agent is a mobile device.

12. The apparatus of claim 8, wherein the transmitter is configured to transmit the call request to an outdialer call proxy server, dial the agent's phone number from the outdialer call proxy, and connect the live call between the mobile device and the agent call device via the outdialer call proxy server.

13. The apparatus of claim 8, wherein the call is routed to at least one of an interactive voice response menu and the agent call device associated with the live agent by using a live agent queue to store the call and which automatically dials the agent call device when the agent is available.

14. The apparatus of claim 8, wherein the application operates on the mobile device and is executed and a phone call option to dial a customer service support agent via the application is selected prior to the call being received from the mobile device, and wherein the processor is further configured to create the data record in a database comprising a mobile device identifier of the mobile device and the present inquiry identifier of the type of customer support inquiry associated with the call responsive to the call being executed from the mobile device.

15. A non-transitory computer readable storage medium configured to store instructions that when executed cause a processor to perform:
   intercepting a customer service support inquiry call from a mobile device;
   redirecting the call to an interactive voice response proxy device;
   retrieving a data record comprising a present inquiry identifier of a type of customer support inquiry associated with the call;
   determining a location to route the call based on at least one of the customer inquiry and a customer profile information on the data record;
   determining whether the customer has agent access privileges; and
   if so, routing the call to at least one of an interactive voice response menu and an agent call device associated with a live agent.

16. The non-transitory computer readable storage medium of claim 15 configured to store instructions that when executed cause the processor to perform identifying the call as a customer service support inquiry.

17. The non-transitory computer readable storage medium of claim 15, wherein routing the call comprises operating an outdialer calling function of the interactive voice response proxy device to keep the agent's telephone number from being accessible to the mobile device during the call.

18. The non-transitory computer readable storage medium of claim 15, wherein the agent call device associated with the live agent is a mobile device.

19. The non-transitory computer readable storage medium of claim 15, wherein the processor is further configured to perform:
   forwarding the call request to an outdialer call proxy server and dialing the agent's phone number from the outdialer call proxy; and
   connecting the live call between the mobile device and the agent call device via the outdialer call proxy server.

20. The non-transitory computer readable storage medium of claim 15, wherein routing the call to at least one of an interactive voice response menu and the agent call device associated with the live agent further comprises routing the call to a live agent queue that automatically dials the agent call device when the agent is available.

* * * * *